J. S. M. BROOKS.
Harvester-Droppers.
No. 156,766.
2 Sheets--Sheet 1.
Patented Nov. 10, 1874.
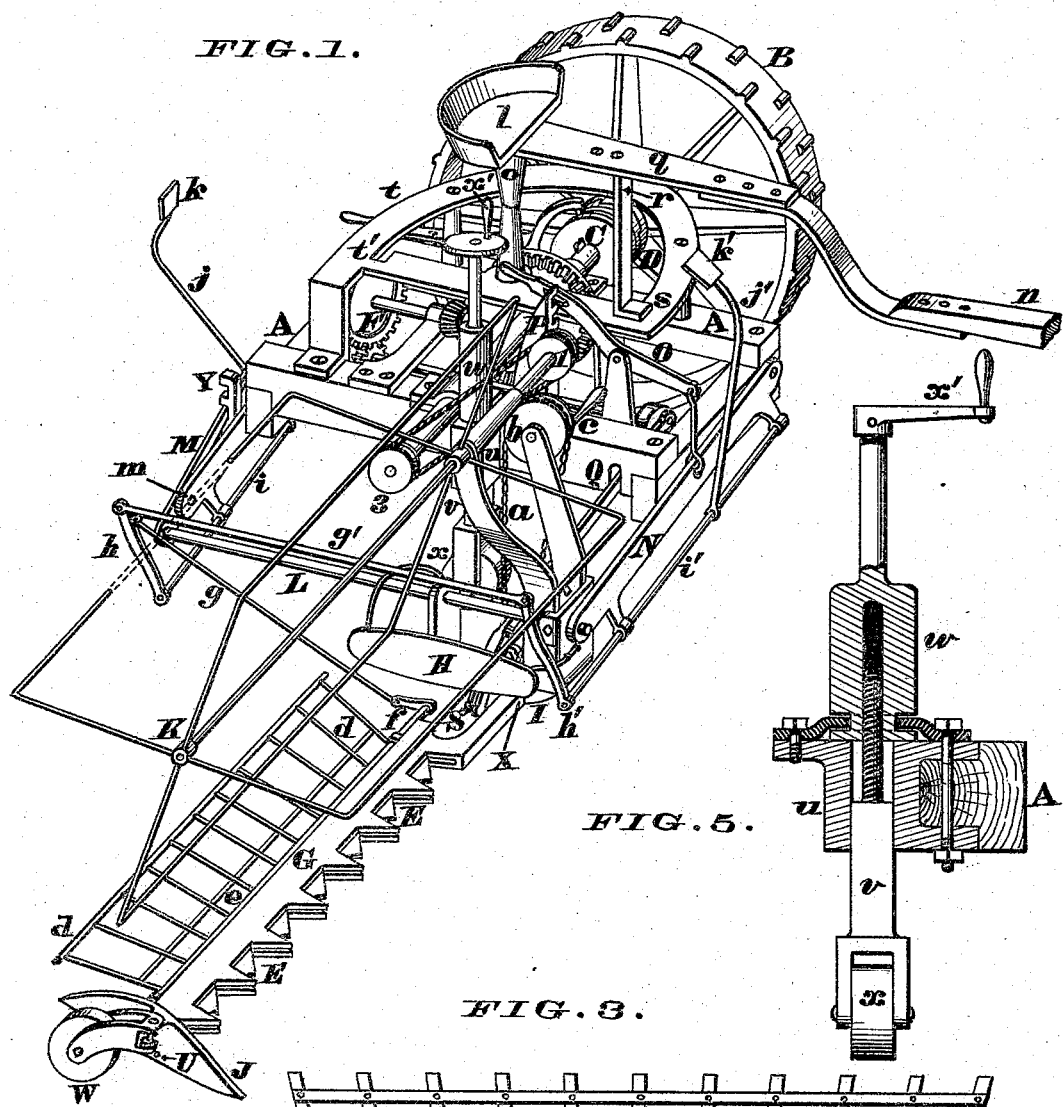
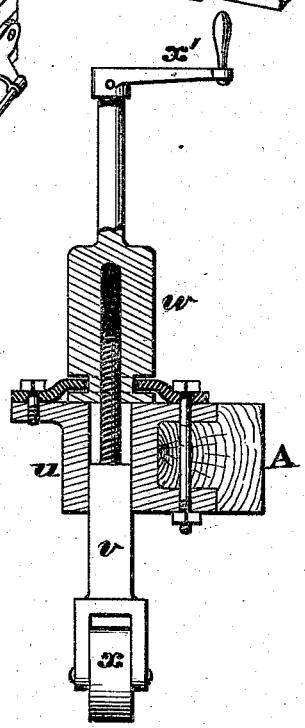
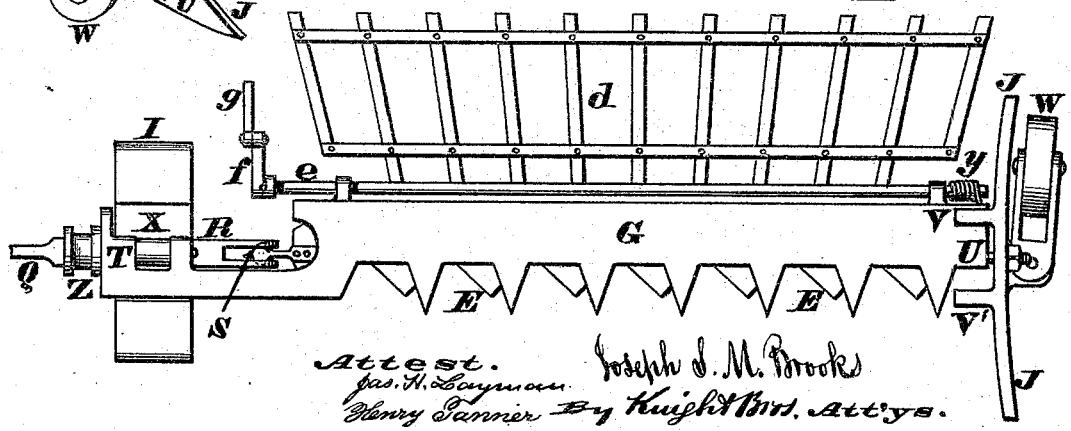

J. S. M. BROOKS.
Harvester-Droppers.
No. 156,766.
2 Sheets--Sheet 2.
Patented Nov. 10, 1874.
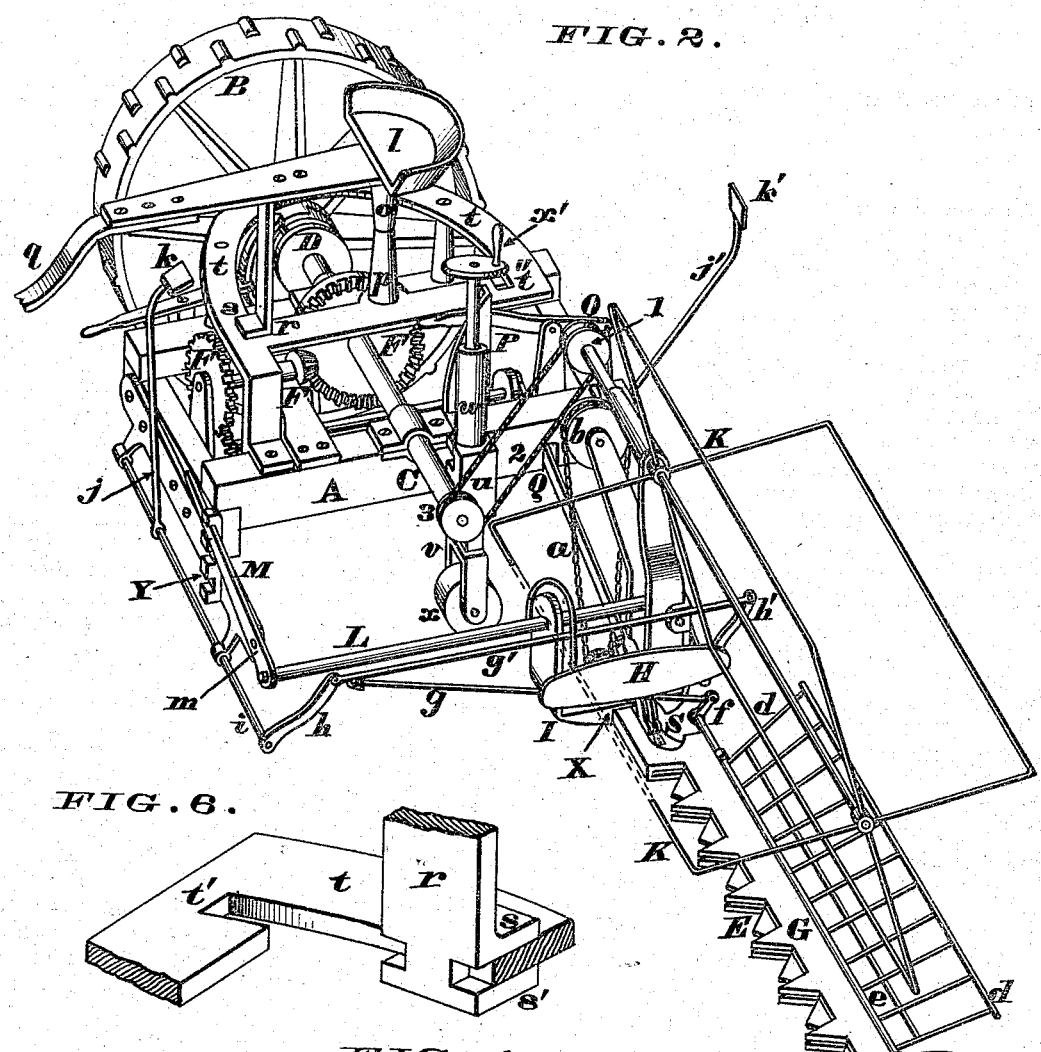
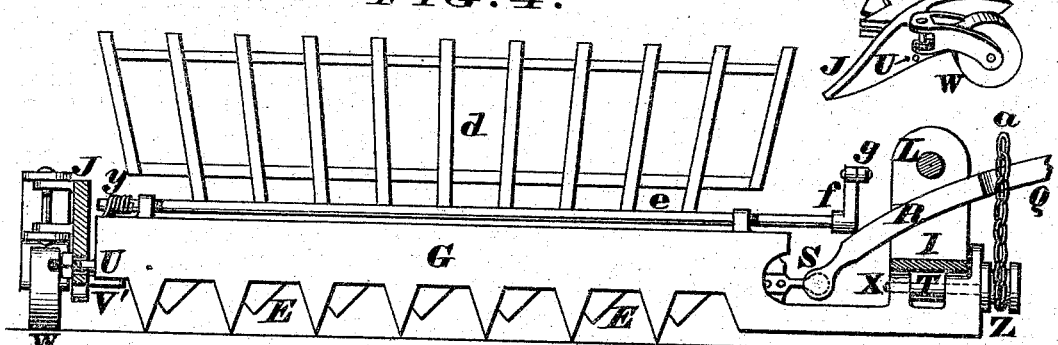
Attest.
Jas. H. Layman,
Henry Tanner.
Joseph S. M. Brooks
By Knight Bros Att'ys.

UNITED STATES PATENT OFFICE.

JOSEPH S. M. BROOKS, OF MOORE'S HILL, INDIANA.

IMPROVEMENT IN HARVESTER-DROPPERS.

Specification forming part of Letters Patent No. 156,766, dated November 10, 1874; application filed September 9, 1874.

*To all whom it may concern:*

Be it known that I, JOSEPH S. M. BROOKS, of Moore's Hill, Dearborn county, Indiana, have invented new and useful Improvements in Harvesters, of which the following is a specification:

My invention is especially designed for those harvesting-machines which deposit the cut grain immediately in the rear of the cutter-bar by means of a vibratable cradle or dropper; and my invention consists in an arrangement of parts whereby the cutter-bar and dropper-controlling devices are made capable of being reversed relatively to the machine, so that the operator, having reached one end of a through or swath, is enabled, by simply half revolving the cutter-bar and reversing the team, to proceed to cut the line of standing grain contiguous to that last operated upon without the necessity of swinging the entire machine, or of making the circuit of the field, which, in rolling ground, imposes a great amount of unnecessary labor on the team and operator.

In the accompanying drawing, Figure 1 is a perspective view of a harvester embodying my improvements, the implement being arranged for a right-hand cut. Fig. 2 is another perspective view of the harvester, with the operative parts reversed as for a left-hand cut. Fig. 3 is a plan, showing the under side of the finger-bar and its accessories. Fig. 4 is a vertical section through the finger-bar, after said bar has made one-fourth of a revolution, or been brought to a perpendicular position. Fig. 5 is a vertical section through the devices that are employed for leveling up the main frame of the machine, and Fig. 6 is a perspective view of the retaining devices of the stay to the driver's seat.

Of the above illustrations, Figs. 3, 4, 5, and 6 are drawn on an enlarged scale.

The following parts may be of customary form, to wit: The main frame A, ground-wheel or driver B, journaled loosely on shaft or axle C, which shares in the rotation of said wheel when clutch D is locked. The motion of shaft C is transmitted to cutter-bar E by any usual or suitable gearing, F. The entire cutting and gathering mechanism, including the cutter-bar E, the finger-bar G, fender H, shoe or runner I, divider J, and reel K, are swung from a customary pivot-bar, L. This bar occupies, at its end most remote from the cutter-bar, a lever, M, which is pivoted to the frame at m, and said lever is locked at any desired elevation by being engaged in a rack, Y, and said bar is at its other end journaled in a floating-bar, N, which, in company with the said cutting and gathering mechanism, is susceptible of being elevated to any desired distance above the ground by lever O and rack P, of usual construction.

Having thus briefly recited the parts which may be of any customary and appropriate form, I now proceed to describe those more immediately connected with my improvements.

The cutter-bar E, instead of being hinged directly to the pitman Q, is connected to said hinge R by means of a ball-and-socket or other universal coupling. S, longitudinally of said bar; and the finger-bar G, instead of projecting rigidly from the shoe I, is connected thereto by swivel T, in line with the swivel S of the cutter-bar. This swivel-bearing T occupies the central portion of a cavity, X, in the under side of shoe or runner I, as more clearly shown in Figs. 3 and 4. In like manner the outer extremity of the finger-bar, instead of being attached rigidly to the divider J, is connected to the divider by a pivot, U, in line with the swivel T. Lugs V V', that project inward from the divider, serve to prevent any rotation of the cutter in excess of one hundred and eighty degrees, more or less, as required. A caster, W, swiveled to the divider J, serves to automatically hold the latter and the finger-bar to the proper pitch, whether the machine be set for cutting to right or left.

This mode of connection permits the entire cutter to be revolved about its own axis, so as to present the cutting-edge either forward or backward, and thus enables a reverse cut without swinging the machine; or, in other words, it enables the conversion of the machine into a right-hand or left hand-one at will, so that the machine may be worked backward and forward on its own tracks.

The lever M, instead of being adjustable, may be a rigid projection from the frame; but I prefer to have it pivoted thereto, and capable of elevation and depression, as above explained, so as to enable the nice adjustment of the pitch of the fingers at the inner end of cutter to agree with that imparted by the divider to the outer end of the cutter.

To enable the cutter to be reversed readily, the swivel R may have a sheave, Z, connected by a chain, a, with sheave b, having a winch or handle, c. The dropper or cradle d is journaled by means of arbor e to rear edge of finger-bar G. This arbor has an arm, f, connected, by rods $g\ g'$, arms $h\ h'$, shafts $i\ i'$, and arms $j\ j'$, with two distinct treadles, $k\ k'$, in such position that one or other treadle is at all times convenient to the driver's foot. The driver's seat l and the draft-pole n are united rigidly to one another, but not to the machine, being capable of a horizontal rotation through the half of a circle, so as to be presented either forward or rearward, to agree with the presentation of the cutter for the time being. For this purpose the seat rests, by socket o, upon a post, p, and the shank q of the tongue or pole n is made fast either to this socket or to the under side of the seat. A stay, r, which extends downward from shank q, has lips $s\ s'$, which, engaging under and over a semicircular bar, t, cause the tongue and the machine itself to have a rigid connection as against any vertical strain, as more clearly shown in Fig. 6. The semicircular bar t is notched at $t'\ t''$, for the reception of lower portion of stay r; and, if preferred, this bar may be perforated near said notches, to admit a bolt or pin that may pass through corresponding apertures in the lips $s\ s'$. When thus arranged the pin would prevent any accidental turning of the seat l, and a chain could be provided to allow the ready withdrawal of the coupling-pin whenever the driver wishes to reverse the direction of the team.

The usefulness of this machine being very conspicuous on steep hill-sides, its frequent use in such situations, and the desirability of always maintaining the driver's seat in a horizontal position, have induced me to provide a means for readily righting the main frame. For this purpose a socket, u, which projects from the inner side of the frame, holds and guides a screw-threaded leg, v, and a nut, w. Of these members, the nut w is capable of rotation, but incapable of vertical movement, and the leg v, whose screw-threaded portion occupies the said nut, is capable of vertical displacement only. In consequence of this it follows that any rotation of w operates either to protrude or retract the leg. The lower end of said leg has a wheel or roller, x, which rests upon the ground, while its upper end carries a hand-wheel or operating-crank, $x'$. The dropper is restored to its normal or receiving position, after deposition of each load, by customary spring y, or other means. The shaft of reel K is provided with a pulley, 1, from which a band, 2, extends to a pulley, 3, on the inner end of driving-axle C.

The operation of my improvement is as follows: Commencing at one of the corners of the field or inclosure—if a hill-side, preferably one of the upper corners—the team is made to face the highest remaining corner, and the machine is righted by means of the adjustable leg v. The pitch also is, if necessary, rectified by the lever M. The driver then, resting his foot on the treadle k or $k'$ in front of him, starts the team forward, and permits the dropper to descend and deposit its load from time to time by releasing the treadle, which, on becoming empty, immediately returns to its receiving position under action of spring y. The machine having reached the termination of the swath, the cutter is reversed, and the team is flanked around the half-circle until their heads are pointed in the opposite direction to that in which they were before. The machine is then directed into the body of standing grain, and the work proceeds as before.

The above-described embodiment of my invention may be varied in non-essential particulars. For example, instead of the sheave Z, the swivel T may have a worm-wheel, operated upon by an endless screw. For use on level or nearly level ground, the leg v may be dispensed with, and an inner ground-wheel, of corresponding diameter to the driver B, be placed upon the axle C. The dropper may be held to its upper position by a catch or catches releasible by the driver. The roller x may be adjusted by a rack and pinion, or by a rack and worm, instead of a nut and screw, as shown.

I claim herein as new and of my invention—

In combination with the reversible cutter E G and reversible seat l, the duplicate dropper-controlling devices, to wit, the arbor e, arms $f\ h\ h'\ j\ j'$, rods $g\ g'$, shafts $i\ i'$, and treadles $k\ k'$.

In testimony of which invention I hereunto set my hand.

JOSEPH S. M. BROOKS.

Attest:
  GEO. H. KNIGHT,
  S. B. SPEAR.